(12) United States Patent
Fokine (10) Patent No.: US 6,512,873 B1
(45) Date of Patent: Jan. 28, 2003

(54) OPTICAL BODY HAVING MODIFIABLE LIGHT GUIDING PROPERTIES

(75) Inventor: Michael Fokine, Bandhagen (SE)

(73) Assignee: Acreo AB, Kista (SE)

( * ) Notice: Subject to any disclaimer, the term of this patent is extended or adjusted under 35 U.S.C. 154(b) by 0 days.

(21) Appl. No.: 09/647,948
(22) PCT Filed: Apr. 1, 1999
(86) PCT No.: PCT/SE99/00550
§ 371 (c)(1), (2), (4) Date: Jan. 31, 2001
(87) PCT Pub. No.: WO99/50696
PCT Pub. Date: Oct. 7, 1999

(30) Foreign Application Priority Data

Apr. 1, 1998 (SE) .................................. 9801161

(51) Int. Cl.$^7$ .............................. G02B 6/18; G02B 6/22
(52) U.S. Cl. ...................... 385/124; 385/127; 385/142
(58) Field of Search ........................ 385/123–124, 385/126–127, 142

(56) References Cited

U.S. PATENT DOCUMENTS

| 5,142,603 A | | 8/1992 | Forrester ..................... 385/98 |
| 5,235,659 A | * | 8/1993 | Atkins et al. ................ 385/124 |
| 5,301,252 A | | 4/1994 | Yanagawa et al. ............ 385/96 |
| 5,381,503 A | | 1/1995 | Kanamori et al. .......... 385/123 |
| 5,500,031 A | | 3/1996 | Atkins et al. ................. 65/386 |
| 6,125,225 A | * | 9/2000 | Dianov et al. .............. 385/124 |

FOREIGN PATENT DOCUMENTS

| EP | 622343 A2 | * | 4/1994 |
| SE | 9603406-1 | | 9/1996 |
| WO | WO9400784 | | 1/1994 |

OTHER PUBLICATIONS

Phillip St. Russel, et al., "Fibre gratings", Physics World, Oct. 1993, pp. 41–46.
H. Y. Tam, "Simple Fusion Splicing Technique for Reducing Splicing Loss Between Standard Singlemode Fibres and Erbium–doped Fibre", Electronics Letters, Aug. 15, 1991, Vol. 27, No. 17.
J.S. Harper, et al., "Tapers in Single–mode Optical Fibre by Controlled Core Diffusion", Electronics Letters, Feb. 18, 1988, vol. 24, No. 4.
Kazuo Shiraishi, et al., "Beam Expanding Fiber Using Thermal Diffusion of the Dopant", J. Lightw. Techn., vol. 8, No. 8, Aug. 1991.
Kazuo Shiraishi, et al., "Light–Propation Characteristics in Thermally Diffused Expanded Core Fibers", J. Lightw. Techn., vol. 11, No. 10, Oct. 1993.
J. Kirchhof, et al., "Diffusion behavious of fluorine in silica glass", J. of Non–Cryst. Solids 181, 1995, pp. 266–273.

* cited by examiner

Primary Examiner—Akm E. Ullah
Assistant Examiner—Jerry T Rahll
(74) Attorney, Agent, or Firm—Birch, Stewart, Kolasch & Birch, LLP (57) ABSTRACT

In an optical fiber or other light guiding body is utilized that the diffusion properties of fluorine, which reduces the refractive index, are strongly changed, if also a doping with phosphorous is made, to change the refractive index and hereby the light guiding properties. In for example a single mode fiber (1) thus locally an additional waveguide core (9) can be created parallel to the already existing waveguide core (3), by providing in parallel to the ordinary core (3) an activatable region (5) having substantially the sane dimensions as the existing core and having suitable dopings of fluorine and phosphorous. This can be utilized to produce an optical filter element If the optical fiber is D-fiber, a sensor element can be produced. Furthermore, for suitable concentrations of these dopants and of germanium an existing waveguide core can be erased by a heating operation.

18 Claims, 5 Drawing Sheets

Fig. 1d    F-conc.

Fig. 1e    F-conc.

Fig. 1f    P-conc.

Fig. 1g    Ge-conc.

Fig. 2a

Fig. 2b heated length

Fig. 5d  F-conc.

Fig. 5e  F-conc.

Fig. 5f  P-conc.

Fig. 5g  Ge-conc.

F-conc.

Fig. 7e

F-conc.

Fig. 7f

P-conc.

Fig. 7g

Ge-conc.

OPTICAL BODY HAVING MODIFIABLE LIGHT GUIDING PROPERTIES

TECHNICAL FIELD

The invention relates to an optical body having modifiable light guiding properties, in particular an optical fiber, the light guiding properties of which can locally be changed by a suitable treatment, and to a method of producing an optical waveguiding body.

BACKGROUND

Several different methods of locally changing the light guiding properties such as the refractive index in an otherwise finished optical waveguide are previously known. Here can be mentioned:

1. Permanent increases of the refractive index in $SiO_2$-based optical fibers doped with germanium oxide can be obtained by subjecting such fibers to ultraviolet radiation. This radiation should have wavelengths corresponding to the wavelengths of some absorption interval or intervals of germanium oxide(s). An example of the use of such changes of refractive index induced by ultraviolet light are fiber gratings, which are described e.g. in the document by Phillip St. Russel et al., "Fibre gratings", Physics World, October 1993, pp. 41–46, and the published International patent application WO 94/00784. The produced gratings are for example utilized as filters. The grating structure of such gratings disappears, when they are exposed to temperatures higher tan 500–900° C.

2. The increase of the refractive index of glass material doped with germanium oxide can be reinforced, by making, before the treatment with ultraviolet light, hydrogen diffuse into the material, so called hydrogen sensitization. The refractive index of glass material doped with germanium oxides, phosphorous or phosphorous-aluminium can also be increased by making first hydrogen diffuse into the material in a treatment in a hydrogen gas atmosphere at a high pressure and by thereupon heating the material at not too high temperatures, such as in an interval above 500° C., see U.S. Pat. No. 5,500,031 for Atkins et al. corresponding to the published European patent application 0622343.

3. In the the Swedish patent application 9603406-1, filed Sep. 17, 1996, instead a chemical reaction induced by light is used to achieve such changes Then fluorine atoms are supposed to already initially exist in the core of the fiber, which atoms can be assumed to be bonded in the glass structure. To the fiber hydrogen atoms are added by making them diffuse into the fiber from a surrounding hydrogen gas atmosphere having a high pressure. The fiber is irradiated at selected areas with ultraviolet light in order to make the germanium atoms in the core together with hydrogen, which has diffused into the material, and the quarts material of the fiber form hydroxyl groups. The hydroxyl groups formed react with fluorine atoms to form hydrogen fluoride. Hydrogen fluoride is not bonded too strongly to the material but can by means of a suitable heating operation be made to diffuse from the core into the surrounding material. Thereby the concentration of fluorine in the core within the irradiated region is reduced, what increases the refractive index of the core within these regions. This method can be summarized by: Glass doped with fluorine is used in a fiber, which is first subjected to a hydrogen sensitization, thereupon to a UV-exposure and finally to a heating operation.

4. Dopants, for example germanium and fluorine atoms, which are initially arranged in a glass material, can diffuse in a heating operation, what can change the refractive index within portions exposed to heat. Germanium increases the refractive index of glass materials, whereas fluorine reduces the refractive index. Then, if germanium atoms for example exist within a limited region of an optical fiber, in which thus the refractive index is higher than in the surrounding material, the refractive index can be reduced in this limited region by a heating operation. Inversely the refractive index can by a heating operation be increased within a region having only fluorine atoms.

The methods according to 1. and 3. above are primarily used to produce grating structures, i.e. periodic changes of the refractive index in space, such as changes in the waveguiding core in an optical waveguide, for example changes of the refractive index of is the core in an optical fiber, which are periodic along the longitudinal axis of the fiber.

The method according to 2. above can be used to increase the refractive index of regions doped with germanium oxides, e.g. to produce waveguides in planar substrates and thus to allow the manufacture of integrated optical components.

The methods according to 1., 2. and 3. change the refractive index only within the regions, in which there initially is some concentration of germanium and/or of fluorine atoms. Surrounding, substantially undoped regions, such as for example the cladding of an optical fiber having a doped core region, are not generally noticeably influenced. The core in an optical waveguide maintains in these cases, during the processing, its extension, in particular its radius when the optical body considered is an optical fiber.

In the method according to 4. above very high temperatures must be used to produce a noticeable diffusion. In many typical waveguides, such as in conventional optical fibers intended for telecommunication, the increase of the refractive index in the portion, which is to form the very waveguide or the core of the waveguide, is produced by doping the glass material with germanium oxide $GeO_2$ when producing the waveguides. When thus a conventional optical fiber is exposed to a high temperature of the magnitude of order of 1600° C. during a not too short period of time, germanium atoms diffuse away out of the core region into the surrounding material, i.e. into the cladding. The difference between the refractive indices of a material doped with germanium and of a substantially undoped material, such as in the cladding, is proportional to the concentration of germanium atoms, what implies, that the diffusion gives a "smearing" of the refractive index, i.e. the core region is expanded and the refractive index thereof is reduced. The refractive index of a typical optical fiber before and after such a high temperature treatment, which also can be termed a core diffusion, is shown in the diagram of FIG. 7.

For an optical fiber the numerical aperture thereof is given by $$NA = \sqrt{n_1^2 - n_2^2},$$

where $n_1$ is the refractive index of the core of the optical fiber and $n_2$ is the refractive index of the cladding, surrounding the core of the fiber. By a high temperature heating operation thus the numerical aperture of the fiber can be reduced and in particular such a heating operation can be used in the end region of the fiber when connecting it to other fibers or components.

In the articles by H. Y. Tam, "Simple Fusion Splicing Technique for Reducing Splicing Loss Between Standard Singlemode Fibres and Erbium-doped Fibre", Electronics Letters, Aug. 15, 1991, Vol. 27, No. 17, and J. S. Harper et al., "Tapers in Single-mode Optical Fibre by Controlled Core Diffusion", Electronics Letters, Feb. 18, 1988, Vol. 24, No. 4 core diffusion is used to adapt mode fields when connecting optical fibers having different numerical apertures to each other or for adaption when connecting optical fibres having different diameters to each other. Core diffusion can also be used to adapt the mode fields in different "fiber-to-fiber-components", see the articles by Kazuo Shiraishi et al., "Beam Expanding Fiber Using Thermal Diffusion of the Dopant", J. Lightw. Teckin., Vol. 8, No. Aug. 8, 1991, and Kazuo Shiraishi et al., "Light-Propagation Characteristics in Thermally Diffused Expanded Core Fibers", J. Lightw. Techn., Vol. 11, No. Oct. 10, 1993. Mode field adaption is also used in the methods described in U.S. Pat. Nos. 5,301,252, 5,142,603 and 5,381,503.

In the article by J. Kirchhof et al., "Diffusion behaviour of fluorine in silica glass", J. of Non-Cryst. Solids 181, 1995, pp. 266–273, is among other things disclosed, that phosphorous atoms in a $SiO_2$-material strongly favour the diffusion of fluorine atoms, i.e. that fluorine atoms in such a material obtain an increased mobility and diffuse much more easily, when also phosphorous atoms exist in the material. In contrast the existence of germanium atoms does not significantly influence the diffusion characteristics of fluorine. In the cited U.S. Pat. No. 5,500,031 for Atkins et al. is mentioned that the refractive index of a P-F doped ordinary cladding material increased significantly during a heating. The cladding material also contained hydrogen.

SUMMARY

It is an object of the invention to provide optical structures, in particulair optical fibers, which can selectively be given modified waveguiding properties and which selectively maintain some of the modified properties even when they are subjected to very high temperatures.

It is another object of the invention to provide a method of producing an optical waveguiding structure, in particular an optical fiber, which by a local process is given modified waveguiding properties and which can maintain some of the modified properties even when it is subjected to very high temperatures.

Using suitably selected dopants and suitably selected concentrations thereof in an optically transparent ground mass such as in the cladding in an optical fiber and by a local heating operation the refractive index structure can be changed, whereby waveguides or waveguide cores can be "created" or "erased" and at the same time other existing structures comprising waveguide cores, if desired, can remain substantially unchanged. This can be obtained by using in for example an optical fiber of in principle a standard type for telecommunication that the diffusion properties of fluorine, which reduces the refractive index, are strongly changed, if also a doping with phosphorous is made, which increases the refractive index. Fluorine combined with phosphorous thus diffuses much more easily than only fluorine, when no phosphorous atoms exist, and much more easily than germanium and phosphorous. Hydrogen atoms are not required.

In specially designed optical fibers of type single mode fibers thus locally additional waveguide cores can be created parallel to the already existing waveguide core. In this way to some extent "integrated optical components" can be locally created inside an optical fiber. There is also a possibility of erasing a waveguide core by a suitable initial choice of the dopings and doping levels.

The methods according to 1. and 3. and the method according to the first part of 2. above could be used to create a waveguide core, by exposing a region, which is so doped with germanium oxides and with materials reducing the refractive index such as boron oxides or fluorine, to ultraviolet light that before the treatment with ultraviolet light there is no refractive index difference in the glass material, i.e. no waveguide core exists. A disadvantage of these methods is that it is difficult and time consuming to obtain sufficient increases of the refractive index to produce a normal waveguide core. Further, when using these methods an existing waveguide core cannot be erased.

The method described under 4. can be used only to change a mode field of a waveguide, i.e. the very light distribution in the waveguide, and/or the diameter of the waveguides core. It can therefore hardly be used to create a new waveguide core and is too time consuming to erase an existing waveguide core.

By instead changing the temperature dependent diffusion properties of an atom or ion kind such as fluorine, which constitutes a doping in a glass material, by a sufficient addition of another atom or ion kind such as phosphorous, waveguide cores can be created or erased by a suitable heat treatment, whereas other waveguide cores, which do not contain any of these ion or atom kinds are not noticeably influenced. For the doping system fluorine-phosphorous a temperature in the heat treatment of about 1300° C. is used and thus in this system and at his temperature fluorine, which exists in regions, which simultaneously have a suitable concentration of phosphorous, will diffuse out of these regions.

Thus generally, an optical waveguiding body is considered hereinafter, which contains substantially silicon dioxide and has waveguiding properties for guiding light of some wavelength or wavelength interval or band. Then the body can generally have at least one waveguide core, along which light of the wavelength can propagate. In the body a region is provided which is doped with at least fluorine and phosphorous to carefully determined concentrations. The region does in the preferred case not contain any hydrogen atoms which are free to move when heating the body and which thus are not strongly chemically bonded to the material of the body. The region can be a waveguide core which e.g. works as a standard core for letting light propagate therealong. The region can then contain an additional kind or additional kinds of atoms or ions, e.g. germanium.

The doping concentrations or doping levels of fluorine, phosphorus and possible other ions or atoms are so selected, that when heating a part of the region the refractive index of the heated part of the region for light of the considered wavelength is changed and in some cases even strongly changed. Then the light guiding properties of the heated part of the region for light of the considered wavelength will also be changed or strongly changed respectively. Differently selected concentrations and locations of the region, in particular of the heated part of the region will then produce a new waveguide core, erase an existing waveguide core, or change the waveguiding properties of the part which is heated so that light after the heating can or cannot be coupled thereto or therefrom. Typical cases comprise:

The region has before heating no waveguiding properties for light of the considered wavelength but the part of the region forms when heated or after being subjected to a heating process a new waveguide core capable of guiding therealong light of the considered wavelength.

The region has before heating some waveguiding properties for light of the considered wavelength but does not allow coupling of light between the region and another waveguide core in the body. For example the region can have the general shape of a waveguide core but have a refractive index different from that of the other waveguide core resulting in different propagation velocities of light which do not allow coupling of light therebetween. The refractive index of the region can e.g. correspond to a difference between this refractive index and the refractive index of the bulk material of the body, i.e. of the cladding in the case where the body is an optical fiber, the difference being about half the difference between the refractive index of the other waveguide guide and that of the bulk material. The part of the region obtains after heating changed waveguiding properties allowing a coupling of light between the other waveguide core and the heated part of the region.

The region has before heating waveguiding properties for light of the considered wavelength and works substantially as a normal waveguide core of the body. The part of the region looses, after heating, its waveguiding properties, i.e. a waveguide core of the body is made to disappear.

The region has before heating waveguiding properties for light of the considered wavelength and works substantially as a normal waveguide core of the body and allows a coupling of light to and from another waveguide core. The part of the region changes, after heating, its waveguiding properties, loosing the capability of coupling light between the part and the other waveguide core. For example, the refractive index difference of the part can be reduced to about half the refractive index difference of the other waveguide core, the refractive index difference being taken as the difference as described above between the refractive index of the considered part or core and that of the bulk.

BRIEF DESCRIPTION OF THE DRAWINGS

The invention will now be described by way of non limiting embodiments with reference to the accompanying drawings, in which.

DESCRIPTION OF PREFERRED EMBODIMENTS

Figure 1A:
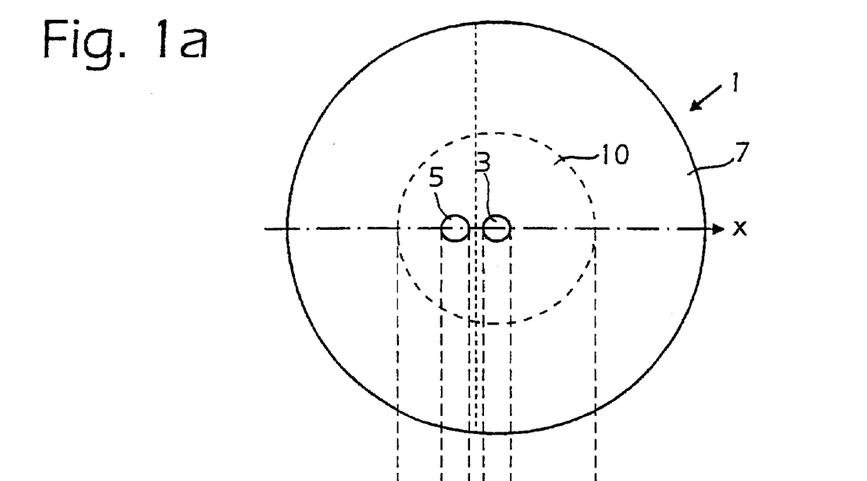
FIG. 1a is a view of a cross-section of an optical fiber taken perpendicularly to the longitudinal direction of the fiber, in which the fiber has a modified composition suitable for manufacturing a fiber having locally an eccentrically located extra core.
Figures 1B, 1C:
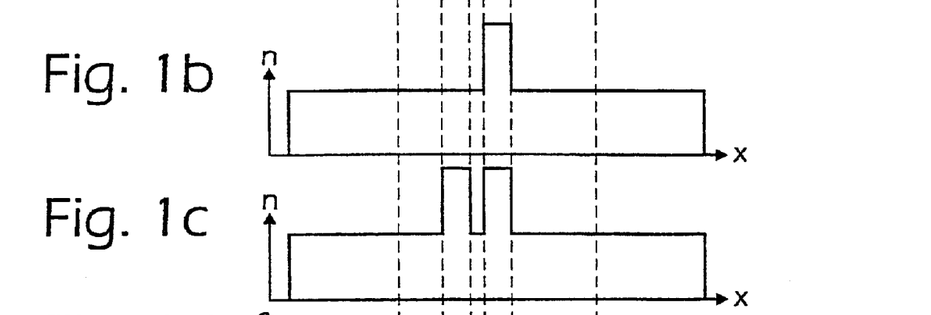
FIG. 1b is a graphical plot, which schematically shows the refractive index in the fiber of FIG. 1a along a suitably selected diameter or x-axis.
FIG. 1c is a graphical plot similar to that of FIG. 1b, which schematically shows the is refractive index in the fiber of FIG. 1a after a heating operation.

In FIGS. 1a–3 is illustrated how a local Mach-Zehnder structure can be produced in an optical fiber 1, a cross-section of which being shown in FIG. 1a. The optical fiber 1 is in some respects standard type, i.e. the type which is used for for example telecommunication, such as that it is single mode type and is based on silicon dioxide, is weldable to similar fibers by means of welding apparatus of standard type and has a substantially circular-cylindrical exterior boundary surface and a centrally placed core 3 having a substantially circular cylindrical shape. In parallel to the core 3 extends a "sleeping" or activatable core 5, which has substantially the same diameter as the centrally placed core 3. The centrally placed core 3 has a somewhat higher refractive index than the surrounding material, including thus both the very cladding 7 of the fiber and the sleeping core 5, as appears from the graphical plot in FIG. 1b. This graphical plot shows the refractive index along the x-axis 9 drawn in FIG. 1a, which extends along a diameter of the fiber 1 and passes through both the center of the centrally located core 3 and through the center of the sleeping core 5. The material in the cladding 7 and the sleeping core 5 has thus substantially the same refractive index.

Figure 1D:
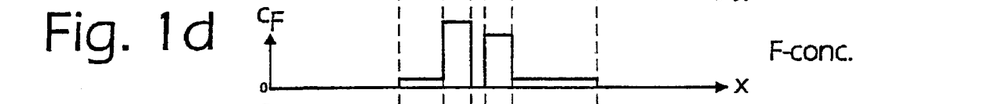
FIG. 1d is a graphical plot, which schematically shows the concentration of fluorine atoms in the fiber of FIG. 1a along an x-axis.
Figure 1E:
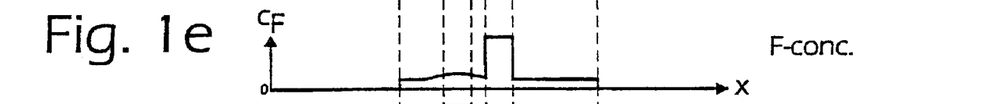
FIG. 1e is a graphical plot similar to that of FIG. 1d, which schematically shows the concentration of fluorine atoms in the fiber of FIG. 1a after a heating operation.
Figure 1F:
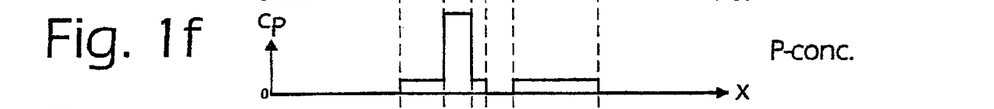
FIG. 1f is a graphical plot, which schematically shows the concentration of phosphorous atoms in the fiber of FIG. 1a along an x-axis.
Figure 1G:
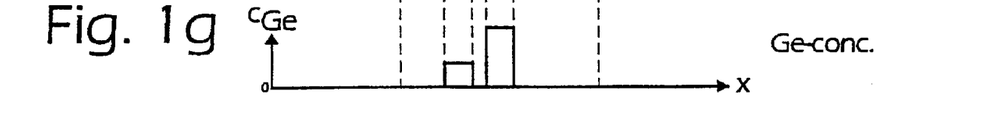
FIG. 1g is a graphical plot, which schematically shows the concentration of germanium atoms in the fiber of FIG. 1a along an x-axis.

The chemical composition of the optical the fiber 1 appears from FIGS. 1d, 1f and 1g, which show the concentration of fluorine, phosphorous and germanium atoms respectively. The centrally located core 3 has a significant concentration of germanium atoms and a significant concentration of fluorine atoms. These quantities of atoms added to the glass mass are also called dopings. The core 3 is in this case thus doped with germanium in the shape of germanium oxides and with fluorine. A doping with germanium and also a doping with phosphorous increase the refractive index of the glass mass whereas a doping with fluorine reduces the refractive index. The sleeping or activatable core 5 has a somewhat higher doping with fluorine, a significantly lower doping with germanium and a significant doping with phosphorous in the shape of phosphorous oxide. The concentrations of these kinds of ions/atoms in the activatable core 5 are so tuned, that it obtains substantially the same refractive index as the material in the cladding 7.

The inner part 10 of the cladding 7 has as conventional some concentrations of fluorine and phosphorous due to the manufacturing method, but which concentrations are low, phosphorous in order to reduce the melt temperature of the substance, from which the optical fiber is drawn, and fluorine in order to neutralise the increase of the refractive index, in which the low concentration of phosphorous would otherwise result.

Figure 2A:
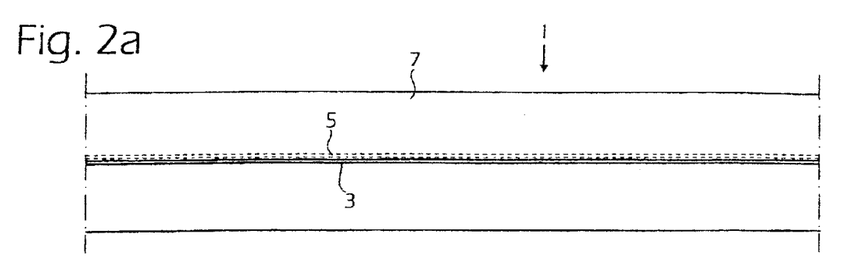
FIG. 2a is a view of a cross-section taken in a plane which extends through the longitudinal axis of the fiber shown of FIG. 1a and contains an x-axis.
Figure 2B:
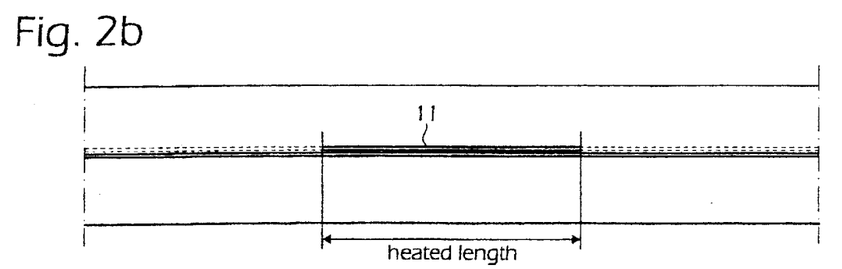
FIG. 2b is a view similar to FIG. 2a, which shows a cross-section of the fiber after local heating.

A limited length of the fiber 1 can now be heated to a high temperature, for example to about 1300° C. during approximatively 10 minutes, see FIG. 2b. The most easily movable kind of atom among the dopants is fluorine and its mobility is in addition significantly higher when phosphorous is present, as has been mentioned above. The heating then results in that the fluorine atoms in the activatable core 5 diffuses out thereof to produce a distribution of fluorine as is schematically shown in FIG. 1e. The concentration of fluorine increases most significantly in the activatable core and since fluorine atoms give a reduction of the refractive index, now the refractive index in the activatable core 5 will be increased. For a suitable choice of concentrations of dopants the heated length of the activatable core will obtain a refractive index of substantially the same magnitude as the centrally located core, see the graphical plot of the refractive index after heating in FIG. 1e. A new extra, parallel core 11 has now been produced in the heated length of the fiber.

Figure 3:
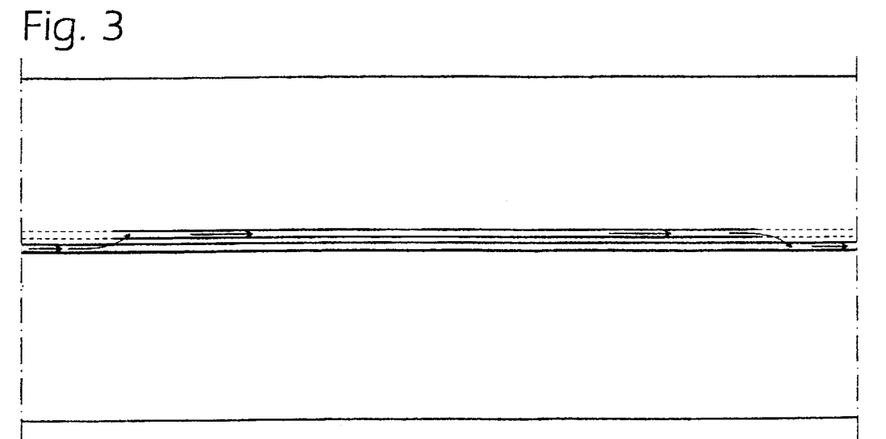
FIG. 3 is a view of a cross-section similar to FIG. 2b but in a somewhat large scale and illustrating light paths in the fiber.

For suitable dimensions of the cores 3 and 11 and particularly of the distance between the exterior boundary or envelope surfaces of the cores light can be coupled out of the centrally located core 3 to the activated, previously sleeping core 11. This coupling of light is schematically shown in FIG. 3, in which the arrows indicate the path of light through the two cores. For a suitable choice of the length of the activated core 11 it can give a positive or destructive interference for light. A component made from such a fiber can thus be used as a filter to filter away, from light containing a plurality of wavelengths, some definite wavelength, i.e. the component can form an optical isolator, and in a special case it can be used to filter away, from two considered wavelengths, only one of the wavelengths, for example to obtain a filter for 1.5/1.3 $\mu$m, in which light having the wavelength of 1.5 $\mu$m is coupled to propagate on through the component, whereas light having the wavelength of 1.3 $\mu$m is coupled into the cladding 7.

Figure 4A:
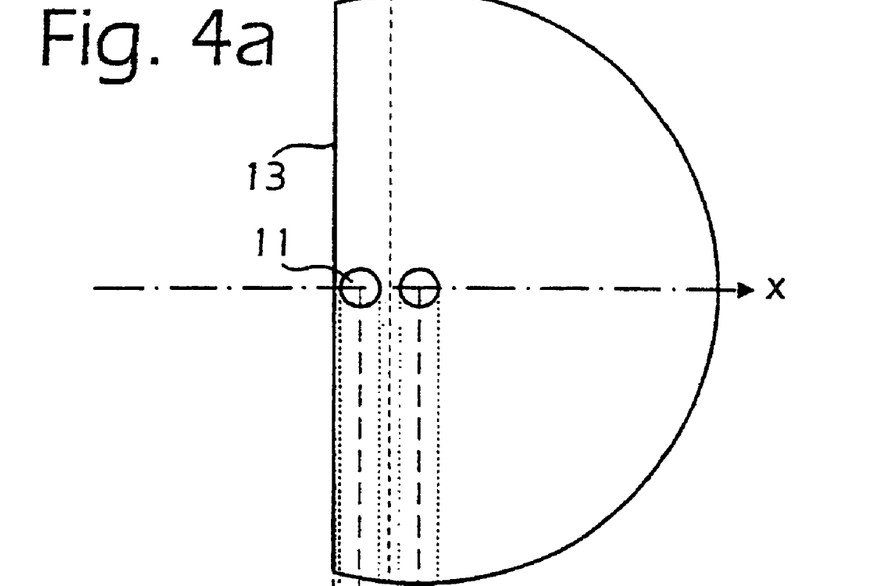
FIG. 4a is a cross-sectional view similar to FIG. 1a, but showing an optical fiber worked to form a D-fiber.

The optical fiber as described above having an activatable extra core 5 can also be used to manufacture low-cost optical components such as modulators and sensors. It can be obtained by producing the fiber as a D-fiber as illustrated in FIG. 4a. A D-fiber has a D-shaped cross-section and the flat surface 13 of a D-fiber should be located close to the activatable core 5, so close that. the evanescent field of light, which propagates in an a activated piece of the optical fiber, with a sufficient portion extends beyond the flat surface 13 and thus outside the fiber. For light having a suitable wavelength, which propagates in such a D-fiber, which over one or several lengths has been provided with double cores by a heating operation as described above, the evanescent field from the activated core lengths will be capable of interacting with a suitably selected, active or passive medium placed around the fiber, particularly at the flat surface 13 thereof. An active medium placed outside the activated cores can actively influence the light propagating in the cores. Providing a passive medium outside the activated cores the fiber can be used as a sensor to sense changes in the refractive index outside the fiber.

Figure 4B:
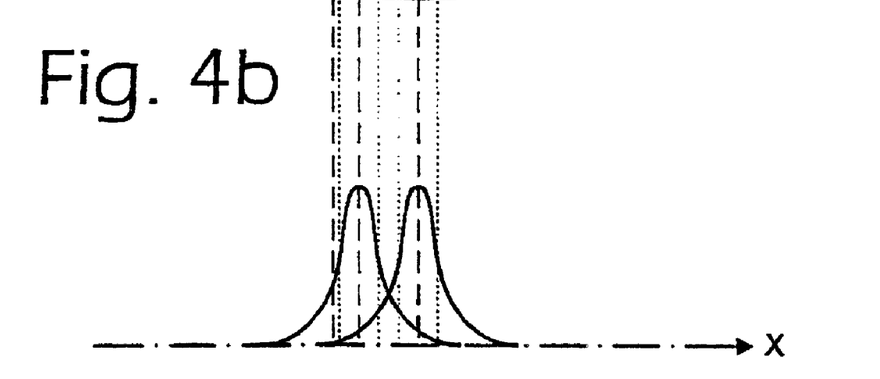
FIG. 4b is a graphical plot, which schematically shows the light field intensity in the fiber of FIG. 4a, FIG. 5a is a view of a cross-section of an optical fiber taken perpendicularly to the as longitudinal direction of the fiber, in which the fiber according to an alternative embodiment has a modified composition, which allows that an existing core is locally erased and that at least one new core is formed at a side of the erased one.
Figure 5A:
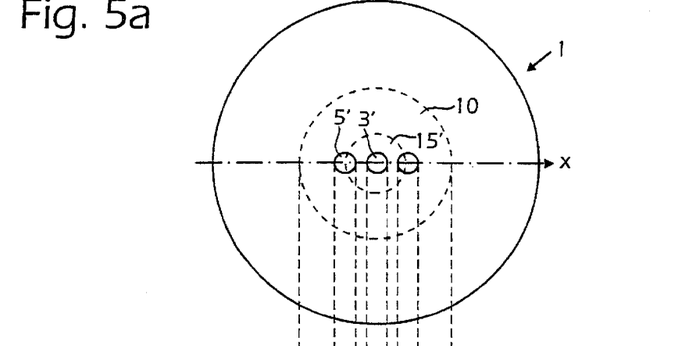
Figures 5B, 5C:
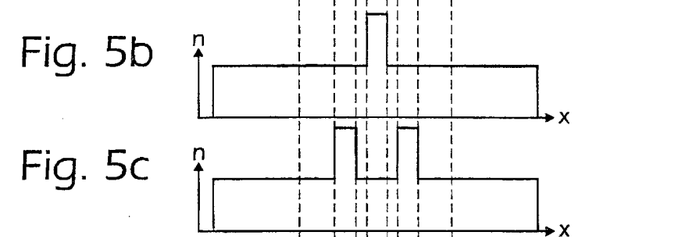
FIG. 5b is a graphical plot, which schematically shows the refractive index in the fiber of FIG. 5a along a suitably selected diameter or x-axis.
FIG. 5c is a graphical plot similar to that of FIG. 5b, which schematically shows the refractive index in the fiber of FIG. 5a after a heating operation.
Figure 5D:
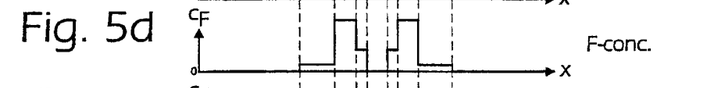
FIG. 5d is a graphical plot, which schematically shows the concentration of fluorine atoms in the fiber of FIG. 5a along an x-axis.
Figure 5E:
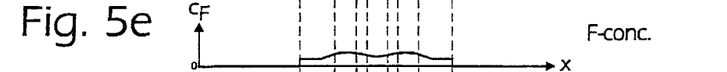
FIG. 5e is a graphical plot similar to that of FIG. 5d, which schematically shows the concentration of fluorine atoms in the fiber of FIG. 5a after a heating operation.
Figure 5F:
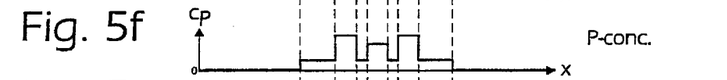
FIG. 5f is a graphical plot, which schematically shows the concentration of phosphorous atoms in the fiber of FIG. 5a along an x-axis.
Figures 5G, 6A:
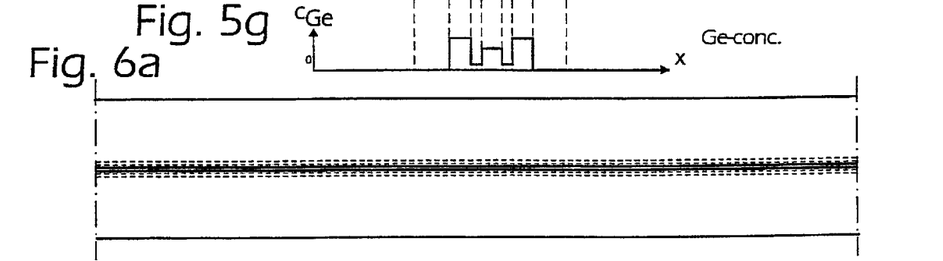
FIG. 5g is a graphical plot, which schematically shows the concentration of germanium atoms in the fiber of FIG. 5a along an x-axis.
FIG. 6a is a view of a cross-section taken in a plane, which extends through the longitudinal axis of the fiber shown in FIG. 5a and contains an x-axis.

In FIG. 4b it is also seen how the evanescent field from the central core 3 with a significant portion passes into the activatable core and thus how light in the central core can interact with light in an activated length of the activatable core 5 and with a portion be coupled to this extra core 11.

A D-fiber according to the description above, which can be given an extra core over selected portions of its length, has the advantage of being capable of sensing or being influenced by exterior conditions only over these selected portions. A D-fiber of common type having a single core, which among other things is used as sensor fiber, instead senses exterior conditions over all of its length if no special arrangements are made. Using the D-fiber as described above having an activatable extra core interferometric structures can be produced in the fiber comprising that one interferometer arm can be influenced by exterior conditions whereas another arm, the reference arm, can be protected from such influence.

In FIGS. 5a–6b is shown, how a waveguide core can be erased. Instead of the erased waveguide core two parallel waveguide cores are obtained. The waveguide core 3' located centrally in the optical fiber 1 has in this case dopings with both germanium oxide and with phosphorous oxide, see FIGS. 1g and 1f, which both significantly contribute to the higher refractive index of the core. In the regions 5', which are to form the two parallel waveguide cores, dopings both with fluorine, phosphorous oxide and germanium oxide are provided. The dopings are selected, so that the refractive index in these regions 5' is substantially equal to the refractive index of the material in the cladding 7. In the inner region 10 of the cladding outside the core 3' and the regions 5' like above some lower concentrations of phosphorous and fluorine exist. Also some concentration of germanium can exist, which cooperates in achieving that the refractive index in this region is maintained close to the refractive index of the surrounding, exterior portion of the cladding 7, also in a following heating operation.

Figure 6B:
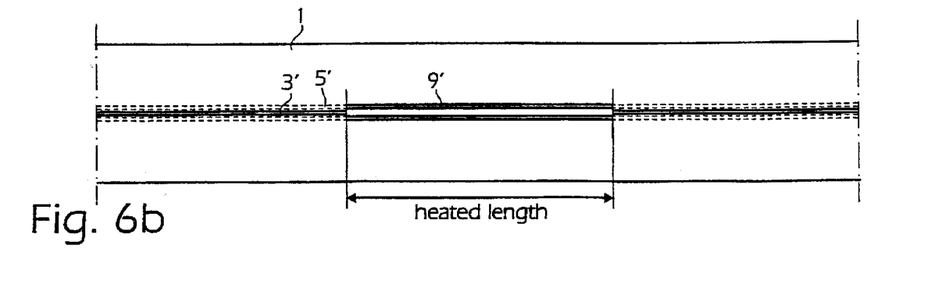
FIG. 6b is a view similar to FIG. 6a, which shows a cross-section after local heating.

In a heating operation of such a fiber 1 over a limited length, provided that suitable doping concentrations have been selected, the central core 3' can disappear and new cores 9' can be created at the side thereof, see FIG. 6b. From FIG. 6c appears the corresponding refractive index. In the heating operation fluorine atoms diffuse away from the regions, where simultaneously phosphorous exists. In particular fluorine atoms diffuse away from the regions 5', the refractive index of which is increased significantly and form the new cores 9'. A substantial portion of the fluorine atoms then diffuse into the existing core 3' and reduces the refractive index thereof, so that this core actually disappears. This effect is reinforced by the fact that in the cylindric region 15 most closely to the centrally located core 3' not too low concentrations of both fluorine and phosphorous exist, so that fluorine from all of the region surrounding the core 3' can diffuse into the core.

If the fiber shown in FIG. 6b is cut off within the heated region, where the double cores 9' created in the heating operation exist, structures having double cores at their ends are obtained. Providing a suitable distance between the new created cores 9', so that light can be coupled between each of the new cores and the remaining portion of the central core and so that light can not be coupled mutually between the new created cores, such structures can be used as couplers to and from common double core fibers, which have their cores placed at the same distance of each other as the "created" cores 9'.

Figure 7A:
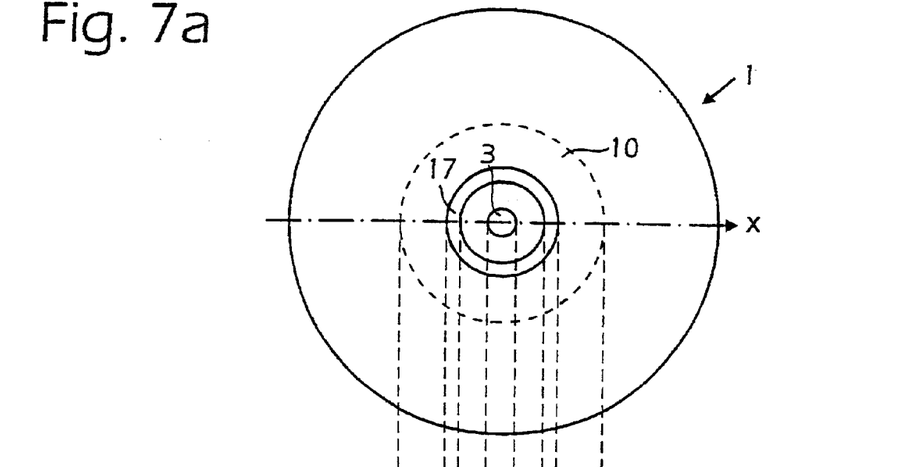
FIG. 7a is a view of a cross-section of an optical fiber taken perpendicularly to the longitudinal direction of the fiber, in which the fiber according to another alternative embodiment has a modified composition suitable for producing a fiber having locally a ring or annular core.
Figures 7B, 7C:
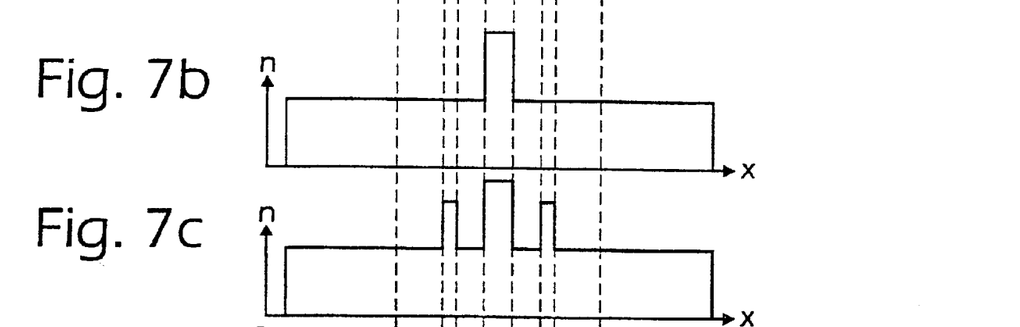
FIG. 7b is a graphical plot, which schematically shows the refractive index in the fiber of FIG. 7a along a suitably selected diameter or x-axis.
FIG. 7c is a graphical plot similar to that of FIG. 7b, which schematically shows the refractive index in the fiber of FIG. 7a after a heating operation.
Figure 7D:
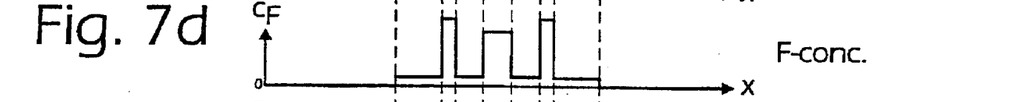
FIG. 7d is a graphical plot, which schematically shows the concentration of fluorine atoms in the fiber of FIG. 7a along an x-axis.
Figure 7E:
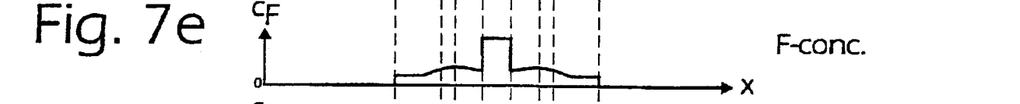
FIG. 7e is a graphical plot similar to that of FIG. 7d, which schematically shows the concentration of fluorine atoms in the fiber of FIG. 7a after a heating operation.
Figure 7F:
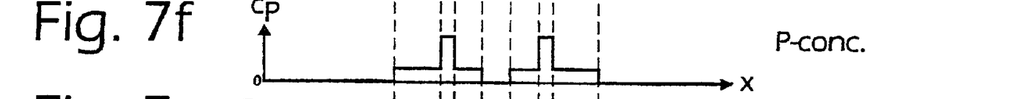
FIG. 7f is a graphical plot, which schematically shows the concentration of phosphorous atoms in the fiber of FIG. 7a along an x-axis.
Figure 7G:
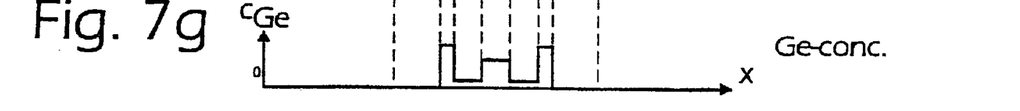
FIG. 7g is a graphical plot, which schematically shows the concentration of germanium atoms in the fiber of FIG. 7a along an x-axis.

Another example of a fiber structure, which has a region which is activatable by means of local heating is shown in FIG. 7a. Around the existing core 3, which is the ordinary constant type, i.e. the type, which is not erased when heated, a ring-shaped core 17 is provided. It is a more or less thick cylindric shell, which surrounds the cylindric core 3 located centrally in the fiber at a selected distance thereof. When heating this type of fiber over a segment in the longitudinal direction thereof, for a suitable refractive index in the new ring-core 17 created thereby, the effective refractive index can be influenced by the electromagnetic mode of a light wave propagating along the regular core 3. The mode field extension of the light wave can then be changed and flier other mode properties can be changed, so that e.g. a change is obtained between wave propagation of multimode type and of single mode type.

An optical body has been described above, which selectively over its length can be given modified light guiding properties, such as an optical fiber having a core, which can be locally erased, or an optical fiber, which can be provided with one or more extra cores over a portion of its length.

What is claimed is:

1. An optical waveguiding body of substantially silicon dioxide for guiding light of a considered wavelength and having at least one waveguide core, comprising:

a region doped with at least fluorine and phosphorous to such concentrations, that when heating a part of the region the refractive index of the heated part of the region for light of the considered wavelength is changed, so that the light guiding properties of the heated part of the region for light of the considered wavelength are changed to at least one of making the heated part of the region form another waveguide core for guiding light of the considered wavelength, changing the waveguiding properties of the part of the region from not allowing to allowing a coupling of light propagating along another waveguide core to the part of the region or inversely of light propagating along the part to another waveguide core, and making a waveguide core disappear, by at least one of eliminating the waveguiding properties of the waveguide core for light of the considered wavelength, and changing the waveguiding properties of the part of the region from allowing to not allowing a coupling of light propagating along another waveguide core to the part of the region or inversely of light propagating along the part to another waveguide core.

2. An optical waveguiding body according to claim 1, wherein the region is substantially hydrogen-free.

3. An optical waveguiding body according to claim 1, wherein the body is an optical fiber having an optical fiber core and that the region is an elongated cylindric region, which is located parallel to the optical fiber core and has substantially the same dimensions, in particular the same diameter, as the optical fiber core.

4. An optical waveguiding body according to claim 1, wherein the body is an optical fiber having an optical fiber core and that the region is an elongated region having the shape of an annular shell, which surrounds the optical fiber core.

5. An optical waveguiding body of substantially silicon dioxide, comprising:

a substantially hydrogen-free region doped with at least fluorine and phosphorous to such concentrations, that when heating a part of the region the refractive index of the heated part of the region is changed so much, that the light guiding properties of the heated part of the region for light of a considered wavelength are strongly changed.

6. An optical waveguiding body according to claim 5, wherein the concentrations are so selected and the region has such a shape and is so located in the body, that the region before heating has no light guiding properties for the considered wavelength, and that after heating the heated part of the region forms a waveguide core for guiding light of the considered wavelength in the body.

7. An optical waveguiding body according to claim 5, wherein the concentrations are so selected and the region has such a shape and is so located in the body, that the region before heating has light guiding properties for the considered wavelength not allowing a coupling of light propagating along another waveguide core to the region or inversely of light propagating along the region to another waveguide core, and that after heating the heated part of the region allows a coupling of light propagating along another waveguide core to the part or inversely of light propagating along the part to another waveguide core.

8. An optical waveguiding body according to claim 5, wherein the concentrations are so selected and the region has such a shape and is so located in the body, that the region forms a waveguide core for guiding light of the considered wavelength, the concentrations being further so selected, that after heating the part of the region ceases to form a waveguide core and is not any longer capable of guiding light of the considered wavelength in the body.

9. An optical waveguiding body according to claim 5, wherein the concentrations are so selected and that the region has such a shape and is so located in the body, that the region forms a waveguide core for guiding light of the considered wavelength allowing a coupling of light propagating along the region to another waveguide core to the region or inversely of the light propagating along the region to another waveguide core, and that after heating the heated part of the region does not allow a coupling of light propagating along another waveguide core to the part or inversely of light propagating along the part to another waveguide core.

10. A method of producing an optical waveguiding body, comprising the steps of:

providing a body of substantially silicon dioxide having at least one waveguide core for guiding light of a considered wavelength;

producing in the body a region which is doped with at least fluorine and phosphorous to predetermined concentrations; and heating at least part of the region, wherein in the step of producing the region, the predetermined concentrations and the location of the region are so selected that in the heating the refractive index of the heated part of the region for light of the considered wavelength is changed, so that the light guiding properties of the heated part of the region for light of the considered wavelength are changed to at least one of to form another waveguide core for guiding light of the considered wavelength, from not allowing to allowing a coupling of light propagating along another waveguide core to the part of the region or inversely of light propagating along the part to another waveguide, and to make a waveguide core disappear, by at least one of eliminating the waveguiding properties of the waveguide core for light of the considered wavelength, and from allowing to not allowing a coupling of light propagating along another waveguide core to the part of the region or inversely of light propagating along the part to another waveguide.

11. A method according to claim 10, wherein, in the step of producing the region, the region is produced to be substantially hydrogen-free.

12. A method according to claim 10, wherein, in the step of providing the body, the body is provided as an optical fiber having an optical fiber core and that, in the step producing the region, the region is made as an elongated cylindric region, which is located parallel to the optical fiber core and has substantially the same dimensions, in particular the same diameter, as the optical fiber core.

13. A method according to claim 10, wherein, in the step of providing the body, the body is provided as an optical fiber having an optical fiber core and that, in the step of producing the region, the region is made an elongated region having the shape of an annular shell, which surrounds the optical fiber core.

14. A method of producing an optical waveguiding body, comprising the steps of:

providing a body of substantially silicon dioxide;

producing a region doped with at least fluorine and phosphorous to predetermined concentrations in the body; and heating at least part of the region, wherein, in the step of producing the region, the region is produced to be substantially hydrogen-free and the predetermined concentrations are so selected, that, in the step of heating, the refractive index of the heated part of the region is changed so much, that the light guiding properties of the heated part of the region for light of a considered wavelength are strongly changed.

15. A method according to claim 14, wherein, in the step of producing the region, the predetermined concentrations are so selected, that the region, before the step of heating, has no light guiding properties for the considered wavelength, and the region is given such a shape and such a location in the body, that, after the step of heating, the heated part of the region forms a waveguide core for guiding light of the considered wavelength in the body.

16. A method according to claim 14, wherein, in the step of producing the region, the concentrations are so selected and the region is given such a shape and such a location in the body, that the region has light guiding properties for the considered wavelength not allowing, before the step of heating, a coupling of light propagating along another waveguide core to the region or inversely of light propagating along the region to another waveguide core, and that, after the step of heating, the heated part of the region allows a coupling of light propagating along another waveguide core to the part or inversely of light propagating along the part to another waveguide core.

17. A method according to claim 14, wherein, in the step of producing the region, the predetermined concentrations are so selected and the region is given such a shape and such a location in the body, that, before the step of heating, the region forms a waveguide core for guiding light of the considered wavelength, and the predetermined concentrations being further so selected, that, after the step of heating, the heated part of the region ceases to form a waveguide core and is not any longer capable of guiding light of the considered wavelength in the body.

18. A method according to claim 14, wherein, in the step of producing the region, the concentrations are so selected and the region is given such a shape and such a location in the body, that the region forms a waveguide core for guiding light of the considered wavelength allowing, before the step of heating, a coupling of light propagating along another waveguide core to the region or inversely of light propagating along the region to another waveguide core, and that, after the step of heating, the heated part of the region does not allow a coupling of light propagating along another waveguide core to the part or inversely of light propagating along the part to another waveguide core.

* * * * *